United States Patent [19]

Niemanns

[11] 4,370,833
[45] Feb. 1, 1983

[54] SEALING ARRANGEMENTS IN THE FORM OF STRIPS

[75] Inventor: Gerd Niemanns, Grefrath, Fed. Rep. of Germany

[73] Assignee: Draftex Development A.G., Zug, Switzerland

[21] Appl. No.: 219,580

[22] Filed: Dec. 23, 1980

[30] Foreign Application Priority Data

Jan. 5, 1980 [GB] United Kingdom ............... 8000343

[51] Int. Cl.³ ............................................. E06B 7/16
[52] U.S. Cl. .................................... 49/489; 49/495; 49/498
[58] Field of Search ................ 49/489, 440, 441, 495, 49/498, 488, 491

[56] References Cited

U.S. PATENT DOCUMENTS

| | | | |
|---|---|---|---|
| 1,767,165 | 6/1930 | Bickett | 49/498 |
| 2,737,412 | 3/1956 | Smith et al. | 49/498 X |
| 2,739,358 | 3/1956 | Kunkel | 49/488 |
| 2,941,838 | 6/1960 | Wernig | 49/489 X |
| 3,290,826 | 12/1966 | Weimar | 49/440 |
| 3,401,075 | 9/1968 | Jackson | 49/441 X |
| 3,448,543 | 6/1969 | Multer | 49/498 X |
| 3,706,628 | 12/1972 | Azzola | 49/495 X |

FOREIGN PATENT DOCUMENTS 1659959 3/1970 Fed. Rep. of Germany ........ 49/440

*Primary Examiner*—Philip C. Kannan
*Attorney, Agent, or Firm*—Leydig, Voit, Osann, Mayer & Holt, Ltd.

[57] ABSTRACT

A sealing arrangement for sealing the edge of a window glass comprises a metal channel mounted at least partially around the window opening so as to be open towards the direction along which the edge of the window glass approaches in closing the opening. A hollow rubber tube is secured within this channel. Two flocked leaves are integral with the tube and extend longitudinally along the surface of the tube which faces the distal edge of the window glass. These leaves are parallel to each other and spaced slightly apart so as to define a longitudinally extending open mouth facing the glass edge. The approaching window glass partially flattens the tube and thereby causes the facing surfaces of the leaves to press against the sides of the window glass immediately adjacent its distal edge.

12 Claims, 3 Drawing Figures

SEALING ARRANGEMENTS IN THE FORM OF STRIPS

BACKGROUND OF THE INVENTION

The invention relates to sealing arrangements, particularly for draught and weatherproofing such as around doors and windows. The sealing arrangements to which the invention relates have particular application to motor vehicle bodies but are not limited to such application.

BRIEF SUMMARY OF THE INVENTION

According to the invention, there is provided a sealing strip for sealing against a distal edge of a movable member, comprising a hollow tube of resilient and flexible material, two flexible and resilient leaves running along and attached to the external surface of the tube and adjacent and substantially parallel to each other so as to define between them a longitudinally shaped upon mouth for receiving the distal edge of the movable member when it moves into the said mouth and tends to flatten the tube thereby causing the leaves to press against the sides of the said member adjacent its distal edge.

According to the invention, there is also provided a sealing strip for sealing the distal edge of a window glass which is movable in a direction parallel with its plane, comprising a substantially rigid channel mounted at least partially around the window opening so as to be open towards the direction along which the distal edge of the window glass approaches in closing the window opening, a hollow tube of flexible and resilient material mounted and secured within the channel and extending longitudinally therealong, and two leaves of flexible and resilient material mounted on and extending longitudinally along the surface of the tube which faces the distal edge of the window glass, the leaves being parallel to each other and spaced slightly apart so as to define a longitudinally extending open mouth facing the distal edge, whereby to receive the distal edge of the approaching window glass which partially flattens the tube and thereby causes the facing surfaces of the leaves to press against the sides of the window glass immediately adjacent its distal edge.

DESCRIPTION OF THE DRAWINGS

Sealing strips and sealing arrangements embodying the invention and for use on a motor vehicle body will now be described, by way of example only, with reference to the accompanying drawings in which.

DESCRIPTION OF PREFERRED EMBODIMENTS

Figure 1:
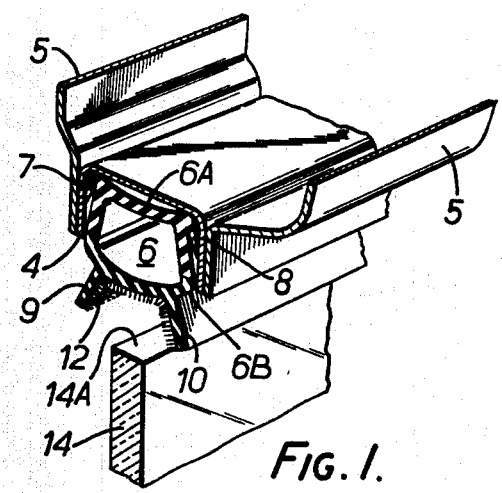
FIG. 1 is a cross-section and perspective view of one of the sealing arrangements.
Figure 2:
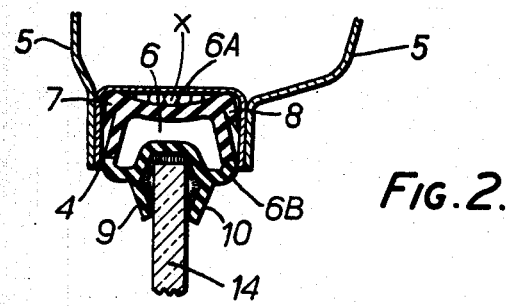
FIG. 2 is a cross-section corresponding to FIG. 1 and showing a window glass sealed by the sealing arrangement.
Figure 3:
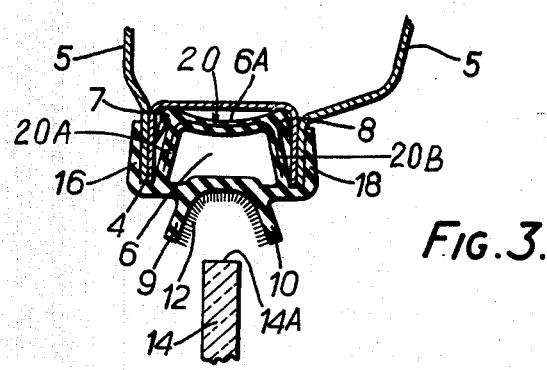
FIG. 3 is a cross-section corresponding to FIG. 1 but showing a modified arrangement.

The sealing strip shown in FIGS. 1, 2 and 3 is for sealing around the glass of an openable window on a motor vehicle. In the particular example being described, the window is a window whose window glass can be raised and lowered, and the Figures show the sealing strip orientated for mounting at the top of the window opening for receiving, and sealing, the window glass as it is raised in the opening to close the opening.

As shown in the Figures, the sealing strip is mounted in an inverted metal channel 4 which is fixed in the metal construction of the window surround 5. Inside the channel 4 is mounted a hollow tube 6 made of suitable material such as plastics or rubber which runs along the length of the channel. On opposite regions of its outside, the tube carries longitudinal lips 7 and 8 which press against the inside surfaces of the side walls of the channel 4 to help to retain the tube 6 in position. Instead or in addition, the tube 6 may be held in position by means of adhesive as shown at x in FIG. 2.

On its underside, the tube 6 carries two downwardly and outwardly projecting leaves 9 and 10 which run the length of the tube 6. The leaves 9 and 10 are made of flexible material. Advantageously, they are integral with (for example, extruded integrally with) the material of the tube 6. The surfaces within the groove or channel defined by the leaves 9 and 10 and the surface of the tube 6 between the leaves are covered with flock 12.

In operation, the leaves 9 and 10 provide a longitudinal "mouth" for receiving the upper edge of the window glass 14 as it is raised to close the window. As shown in FIG. 2, therefore, the edge 14A of the window glass enters this mouth and presses against, and thus flattens, the tube 6 within the channel 4. In so doing, it forces the flocked surface of the leaves 9 and 10 towards each other so that they become aligned with and pressed on the opposite surfaces of the window glass 14 along its distal edge. The actual edge 14A presses against the flocked part of the surface of the tube 6 between the leaves 9 and 10.

The result is, therefore, a very effective seal along and around the distal edge of the window glass, the flocked surface of the flexible material being pressed against the window glass by the inherent resilience of the material. If the tube 6 is closed to the atmosphere the air pressure within the closed tube 6 increases the sealing force but the tube 6 need not be completely closed off.

The side 6A of the tube 6 which runs along the inverted base of the channel 4 may have embedded in it a metal core or carrier for strengthening and reinforcing it. This metal core or carrier could be of shallow channel-form as shown at 20 in FIG. 3 so as to have sides 20A, 20B which extend into the side walls of the tube 6. The metal core or carrier could be resilient with its sides 20A, 20B biased outwardly so as to press the sides of the tube 6 in which they are embedded into frictional contact with the side walls of the channel 4.

In FIGS. 1 and 2, the tube 6 is shown as being made in duplex form from rubber of two different hardnesses. Thus the part 6A of the tube 6 in the channel 4 is relatively hard while the part 6B protruding from the channel 4, including the leaves 9 and 10, is relatively soft. Instead, such a construction could be made in plastics. It is not necessary, however, for the tube to be made of material of two different hardnesses.

In FIG. 3, the material of the tube 6 is shown as being all of the same hardness, but in this case the tube is extended to form longitudinal lips 16 and 18 which extend over the sides of the channel 5 and the surround 4.

The sealing strips described are not restricted to use with windows, but they may be used in other applications where, for example, it is desired to seal the edge of a sliding closure member such as a sliding door or lid.

What is claimed is:

1. A sealing strip arrangement for sealing against a distal edge of a movable member, comprising, a substantially rigid supporting channel, a hollow tube of resilient and flexible material mounted within the supporting channel so as to fill, and having an external surface which is substantially flush with, the longitudinal mouth of the supporting channel, and two flexible and resilient leaves running along the tube's external surface which fills the longitudinal mouth of the supporting channel, the leaves being attached to the said surface of the tube at positions substantially inwardly of the distal edges of the side walls of the supporting channel and being adjacent and aligned with each other so as to define between them a longitudinally shaped open mouth for receiving the distal edge of the movable member, the movable member when it moves into the said mouth tending to flatten the tube thereby causing the leaves to press against the sides of the said member adjacent its distal edge while maintaining the tube in contact with the side walls of the supporting channel adjacent the latter's longitudinal mouth.

2. A sealing strip arrangement according to claim 1, in which the surfaces of the leaves on the inside of the said mouth which they define are covered with flock.

3. A sealing strip arrangement according to claim 1, in which the tube and the leaves are integral.

4. A sealing strip arrangement according to claim 1, in which the tube and the leaves are made of rubber.

5. A sealing strip arrangement according to claim 1, in which the tube is secured within the supporting channel by means of adhesive.

6. A sealing strip arrangement according to claim 1, in which the material of the tube has outwardly projecting lips which run longitudinally along opposite regions of its outside and extend over the outside of the side walls of the rigid supporting channel.

7. A sealing strip arrangement according to claim 1, in which the material on the tube has outwardly projecting lips which run longitudinally along opposite regions of its outside and are compressed between the tube and the insides of the side walls of the rigid supporting channel.

8. A sealing strip arrangement according to claim 1, including a resilient reinforcing carrier embedded within the longitudinally extending part of the wall of the tube opposite the part thereof on which the leaves are mounted.

9. A sealing arrangement for sealing the distal edge of a window glass which is movable in a direction parallel with its plane, comprising a substantially rigid channel mounted at least partially around the window opening so as to have an open mouth facing towards the direction along which the distal edge of the window glass approaches in closing the window opening, a hollow tube of flexible and resilient material mounted and secured within the channel and extending longitudinally therealong so as to fill the channel and to provide an external surface closing off and substantially flush with the mouth of the channel, the material of the tube defining outwardly projecting lips which run longitudinally along opposite regions of its outside and are so positioned as to extend over the distal edges of the side walls of the channel and substantially to cover those side walls, and the material of the tube also defining two leaves of flexible and resilient material mounted on and extending longitudinally along the surface of the tube which closes the mouth of the channel but each positioned inwardly of the distal edges of the side walls of the channel, the leaves being aligned with each other and spaced slightly apart so as to define a longitudinally extending open mouth facing the distal edge of the approaching window glass, whereby to receive the distal edge of the window glass which partially flattens the tube and thereby causes the facing surfaces of the leaves to press against the sides of the window glass immediately adjacent its distal edge.

10. An arrangement according to claim 9, in which the inside surface of the said mouth is substantially completely covered with flock.

11. An arrangement according to claim 9, in which the material of the tube has outwardly projecting lips which run longitudinally along opposite regions of its outside and are compressed between the tube and the insides of the side walls of the rigid supporting channel.

12. A strip according to claim 1 or 9, in which the tube is made of material of two different hardnesses, the part of the tube defining the part of the said surface at which the said leaves are attached being of the lesser hardness and the leaves being of the same hardness as that part of the tube.

* * * * *